United States Patent [19]
Denison, III et al.

[11] 4,428,573
[45] Jan. 31, 1984

[54] MAIL HANDLING APPARATUS

[75] Inventors: Philibert E. Denison, III, Stamford; George Branecky, Bethel, both of Conn.

[73] Assignee: Pitney Bowes Inc., Stamford, Conn.

[21] Appl. No.: 272,955

[22] Filed: Jun. 12, 1981

Related U.S. Application Data

[63] Continuation of Ser. No. 67,851, Aug. 20, 1979, abandoned.

[51] Int. Cl.$^3$ ............................................. B65H 29/58
[52] U.S. Cl. .................................... 271/305; 271/185; 271/251
[58] Field of Search ............... 271/225, 250, 251, 185, 271/216, 303, 305

[56] References Cited

U.S. PATENT DOCUMENTS

| | | | |
|---|---|---|---|
| 2,669,454 | 2/1954 | Babicz | 271/251 |
| 2,767,982 | 10/1956 | Noon | 271/251 |
| 3,700,232 | 10/1972 | Wiegert | 271/216 |
| 4,045,018 | 8/1977 | Michelson | 271/251 |
| 4,146,215 | 3/1979 | Mol | 271/303 |
| 4,257,587 | 3/1981 | Smith | 271/251 |

FOREIGN PATENT DOCUMENTS 950307  2/1964  United Kingdom .................... 271/3

OTHER PUBLICATIONS

IBM Technical Disclosure Bulletin, vol. 16, No. 11, pp. 3676, 3677, Apr. 1974, "Document Aligning Device . . .", J. Gutteling.
"Product Engineering", Feb. 1979, Roller Foot Keeps Paper in Correct Orientation.

Primary Examiner—Richard A. Schacher
Attorney, Agent, or Firm—Donald P. Walker; William D. Soltow, Jr.; Albert W. Scribner

[57] ABSTRACT

Apparatus for handling mailpieces is provided, including a feed deck, having an upright wall, and including instrumentalities for successively feeding mailpieces downstream on said feed deck. The feeding instrumentalities include a device for engaging the lower major surface of respective mailpieces and a directional feed roller assembly; the latter including a roller and a flexible shaft. The roller extends from the flexible shaft for disposition in engagement with the upper major surfaces of respective mailpieces and cooperates with the mailpiece engaging device for urging the mailpieces against the upright wall for edge registration. The apparatus also includes instrumentalities for selectively gating mailpieces from the feed deck and for stacking the gated mailpieces on edge at a receiving station.

6 Claims, 5 Drawing Figures

MAIL HANDLING APPARATUS

This is a continuation of application Ser. No. 067,851 filed Aug. 20, 1979, and now abandoned.

BACKGROUND OF THE INVENTION

This application should be cross-referenced to U.S. patent application Ser. No. 067,852, filed Aug. 20, 1979 by George Branecky and assigned to the assignee of the present invention.

In mail processing systems of the type shown in U.S. Pat. No. 4,034,669, issued July 12, 1977 to G. C. Freeman and assigned to the assignee of the present invention, large quantities of mixed mail are automatically continuously stream fed from an input feeding station; through a weighing station, where the individual mailpieces are weighed to determine the proper postage; through a postage metering station where the proper package is imprinted on the mailpieces; and to a metered mail stacking station from which the metered mail is retrieved by the operator. At one or more locations in the mail stream it is desirable to provide for selectively gating overweight or oversized mailpieces from the mail stream, prior in time to being weighed or metered, as the case may be, without slowing down or otherwise interrupting the continuous flow of other mailpieces through the system, and re-orienting and stacking such rejected mailpieces at a receiving station where they may be easily retrieved by the operator. Prior art apparatus for performing these functions have not only been somewhat complex, and thus expensive to manufacture and maintain, but also have a tendency to impose rough physical treatment on the mailpieces when they are reoriented for stacking purposes. Accordingly:

An object of the invention is to provide mailpiece handling apparatus including means for selectively gating mailpieces from a stream thereof and stacking them at a receiving station; and Another object is to provide such apparatus with means for reorienting mailpieces diverted from the stream to facilitate operator retrieval.

SUMMARY OF THE INVENTION

Apparatus for handling mailpieces is provided comprising a feed deck having an upright wall, and means for successively feeding mailpieces downstream on the feed deck. The feeding means include means for engaging the lower major surface of respective mailpieces and directional feed roller means, the feed roller means including a roller and a flexible shaft. The roller extends from the flexible shaft for disposition in engagement with the upper major surfaces of respective mailpieces and cooperates with the mailpiece engaging means for urging the mailpieces against the upright wall for edge registration. And, the apparatus includes means for selectively gating mailpieces from the feed deck, and means for stacking the gated mailpieces on edge at a receiving station.

BRIEF DESCRIPTION OF THE DRAWINGS

As shown in the drawings, wherein like reference numerals designate like or corresponding parts throughout the several figures.

DESCRIPTION OF THE PREFERRED EMBODIMENTS

Figure 1:
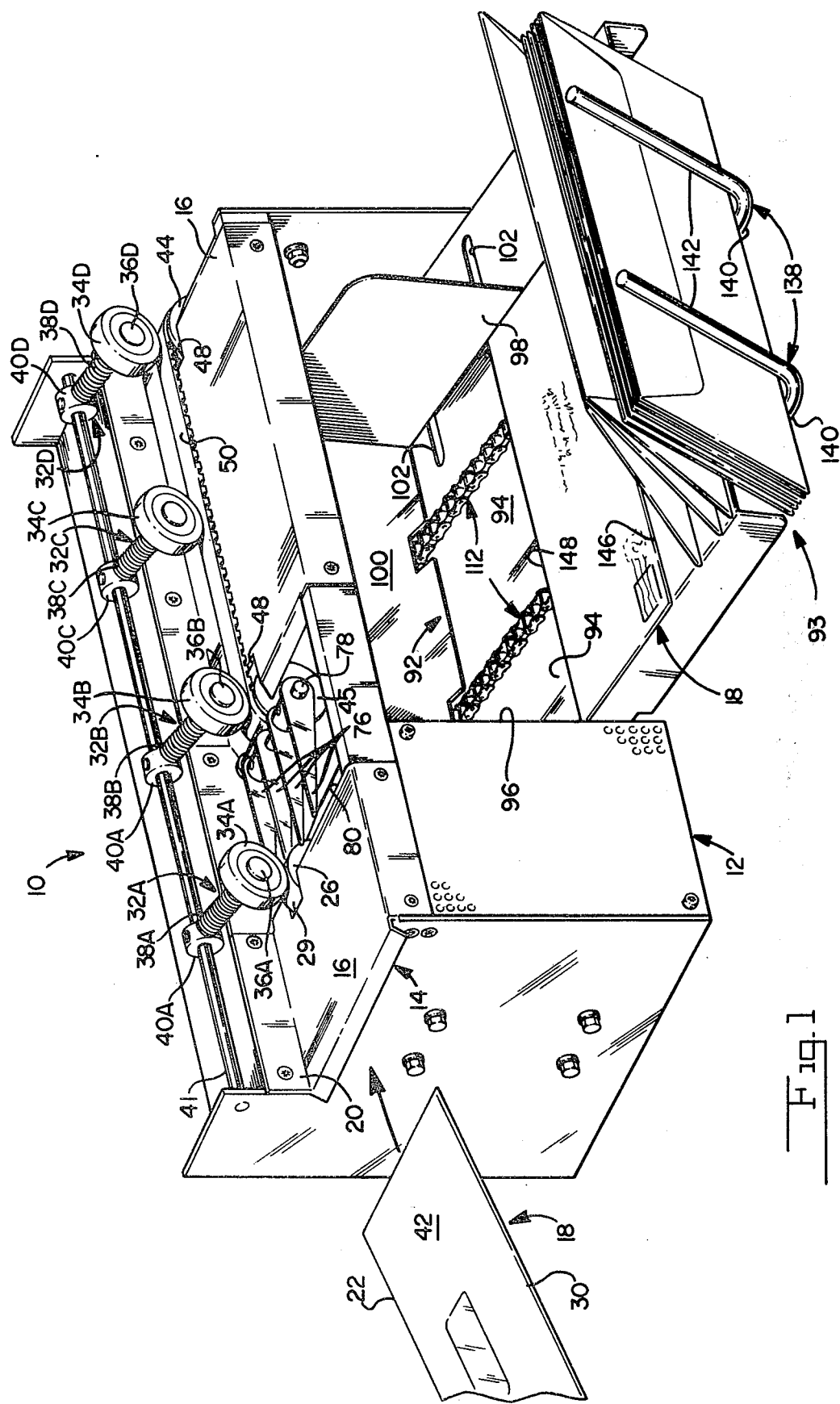
FIG. 1 is a perspective view of mail handling apparatus according to the invention, showing the gate closed for feeding mailpieces through the apparatus.

As shown in FIG. 1, the mailpiece handling apparatus 10 according to the invention includes suitable framework 12 for housing and supporting the various components of the apparatus 10, including a feed deck 14 having a horizontally-extending base wall 16 for receiving substantially horizontally oriented mailpieces 18 from associated mailing equipment such the continuous mail processing apparatus shown in U.S. Pat. No. 4,034,669 issued to G. C. Freeman, July 12, 1977. To align respective mailpieces 18 for feeding purposes, the feed deck 14 also has a vertically oriented guide wall 20 against which one of the longitudinally-extending edges 22 of each mailpiece 18 may be urged for edge registration purposes.

For feeding mailpieces 18 into the apparatus 10, the apparatus 10 has input feeding means including a lower drive roller 26 and a shaft 28 (FIG. 2) on which the lower roller 26 is suitably fixedly mounted for rotation therewith. The shaft 28 is rotatably attached to the framework 12 by well-known means so as to extend transverse to the direction of feed of the respective mailpieces 18 (FIG. 1) and to support the lower roller 26 such that it protrudes upwardly through a slot 29 formed in the feed deck's base wall 16 for frictional engagement with the lower major surfaces 30 of the respective mailpieces 18. The input feeding means also comprises a directional feed roller assembly 32A including an upper roller 34A, a stub shaft 36A on which the upper roller 34A is suitably rotatably mounted, a flexible shaft 38A having one end fixedly attached to the stub shaft 36A, and a collar 40A fixedly attached to the other end of the shaft 38A and adapted to be movably secured to the framework 12. To that end the framework 12 includes a suitable support such a rod 41 on which the assembly 32A is mounted by means of the collar 40A so as to dispose the roller 34A in overhanging relationship with respect to the drive roller 26 and in engagement with the upper major surfaces 42 of respective mailpieces 18 at an angle with respect to the horizontal which tends to urge the respective mailpieces 18 against the feed deck's edge guide wall 20 for edge registration.

For feeding mailpieces 18 out of the apparatus 10, the apparatus 10 has output feeding means including a pair of lower timing pulleys, 44 and 45, and a pair of parallel-spaced shafts, 46 and 47 (FIG. 2), on which the respective pulleys, 44 and 45, are suitably mounted for rotation. The shafts 46, and 47, are respectively suitably connected to the framework 12 by well-known means so as to extend transverse to the direction of feed of the respective mailpieces 18 (FIG. 1) and to support the pulleys, 44 and 45, such that they protrude upwardly through a pair of slots 48 formed in the feed deck's base wall 16. And, pulley 44 is fixedly attached to shaft 46 for rotation therewith; whereas pulley 45 is rotatably attached to shaft 47 for idling rotation thereon. The output feeding means also includes an endless timing belt 50 (FIG. 1) looped about the pulleys, 44 and 45, and about a portion of the feed deck base wall 16 so as to provide a substantially horizontally-extending belt run for frictionally engaging the lower major surfaces 30 of respective mailpieces 18. And, the output feeding means includes plurality of directional feed roller assemblies 32B-D, respectively including a upper rollers 34B-D, stub shafts 36B-D, flexible shafts 38B-D and collars 48B-D. Each of the output feed roller assemblies 32B-D is mounted by means of the collar 40B-D thereof on the rod 41 so as to dispose the rollers 34B-D in overhanging relationship with respect to the belt 50 and in engagement with the upper major surfaces 42 of the respective mailpieces 18 at an angle in respect to the horizontal which tends to urge the respective mailpieces 18 against the feed deck's edge guide wall 20 for maintaining edge registration of mailpieces 18 fed to the output feeding means by the input feeding means.

Figure 5:
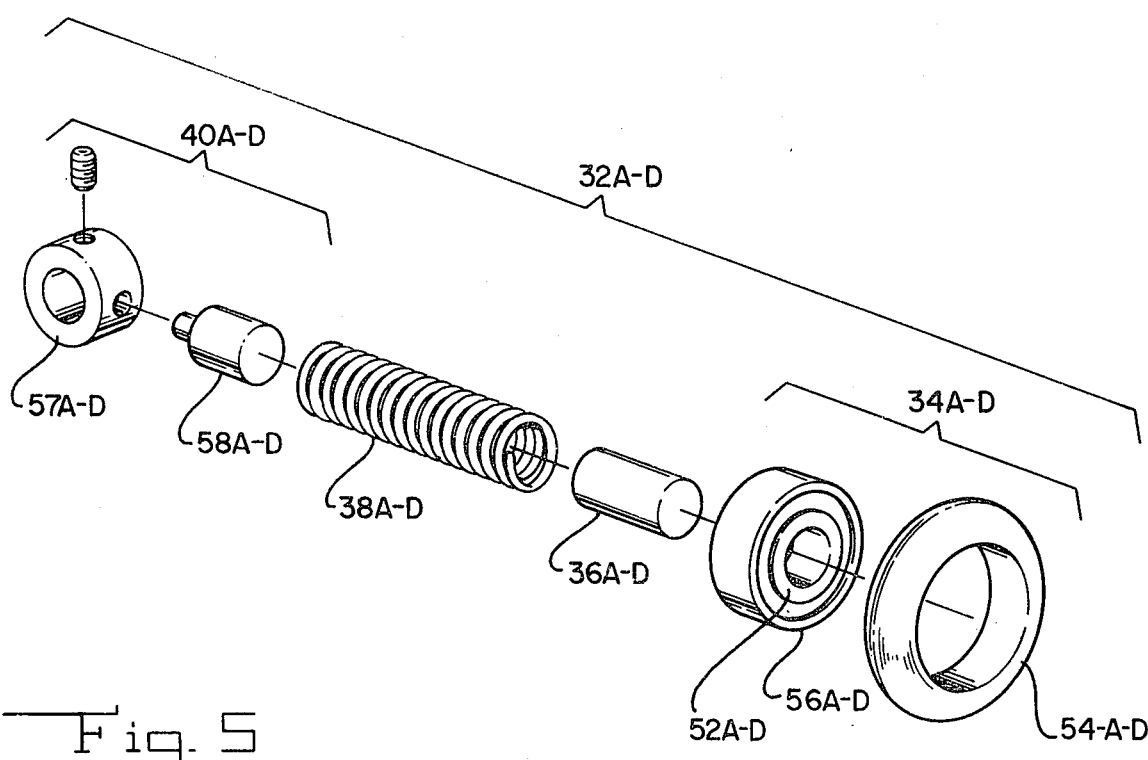
FIG. 5 is an enlarged, perspective view of the directional feed roller assemblies of FIG. 1.

In the preferred embodiment the upper input and output feed rollers 34A-D (FIG. 5) each comprise a conventional ball bearing having its inner race 52A-D fixedly mounted on the associated stub shaft 36A-D. In addition, the rollers 34A-D each include a steel annulus 54A-D, having an arcuately-shaped exterior surface in transverse section, which is fixedly mounted on and in surrounding relationship with respect to the associated roller's outer race 56A-D. In addition, each of the flexible shafts 38A-D preferably comprises a circularly-helically coiled spring facilitating flexure of the shafts 38A-D (FIG. 1) both downwardly and sidewise on the respective mailpieces 18 to ensure continuous engagement of the rollers 34A-D with irregular upper surfaces 42 of respective mailpieces 18. And, the respective collars 40A-D (FIG. 2) include an annulus 57A-D and a stub shaft 58A-D extending therefrom and axially of the associated coil spring shafts 38A-D for connecting the collars 40A-D to the flexible shafts 38A-D.

To drive the input and output feeding means, the apparatus 10 (FIG. 2) includes a coventional motor 60, adapted to be connected by well-known means to a suitable power source (not shown) for energization thereof; and includes an output shaft 62 and a lower timing pulley 64 keyed to the shaft 62 for rotation therewith when the motor 60 is energized. In addition, for feeding means driving purposes, the apparatus 10 includes an upper timing pulley 66, fixedly mounted on the input drive roller shaft 28; and includes a timing belt 68 looped about the lower and upper timing pulleys, 64 and 66, for transmitting rotational movement of the motor shaft 62 to the input drive roller shaft 28 and thus to the input drive roller 26 (FIG. 1) for rotation thereof in engagement with respective mailpieces 18. Further, for feeding means driving purposes, the apparatus 10 (FIG. 2) preferably includes a sprocket gear 70 fixedly mounted on the input drive roller shaft 28, another sprocket gear 72 fixedly mounted on the output timing pulley shaft 46, and a roller-link chain 74 looped about the respective sprocket gears, 70 and 72, for transmitting rotational movement of the input drive roller shaft 28 to the output timing pulley shaft 46 and thus to the output drive pulley 44 (FIG. 1) and timing belt 50 for movement of the belt 50 in engagement with respective mailpieces 18.

Figure 2:
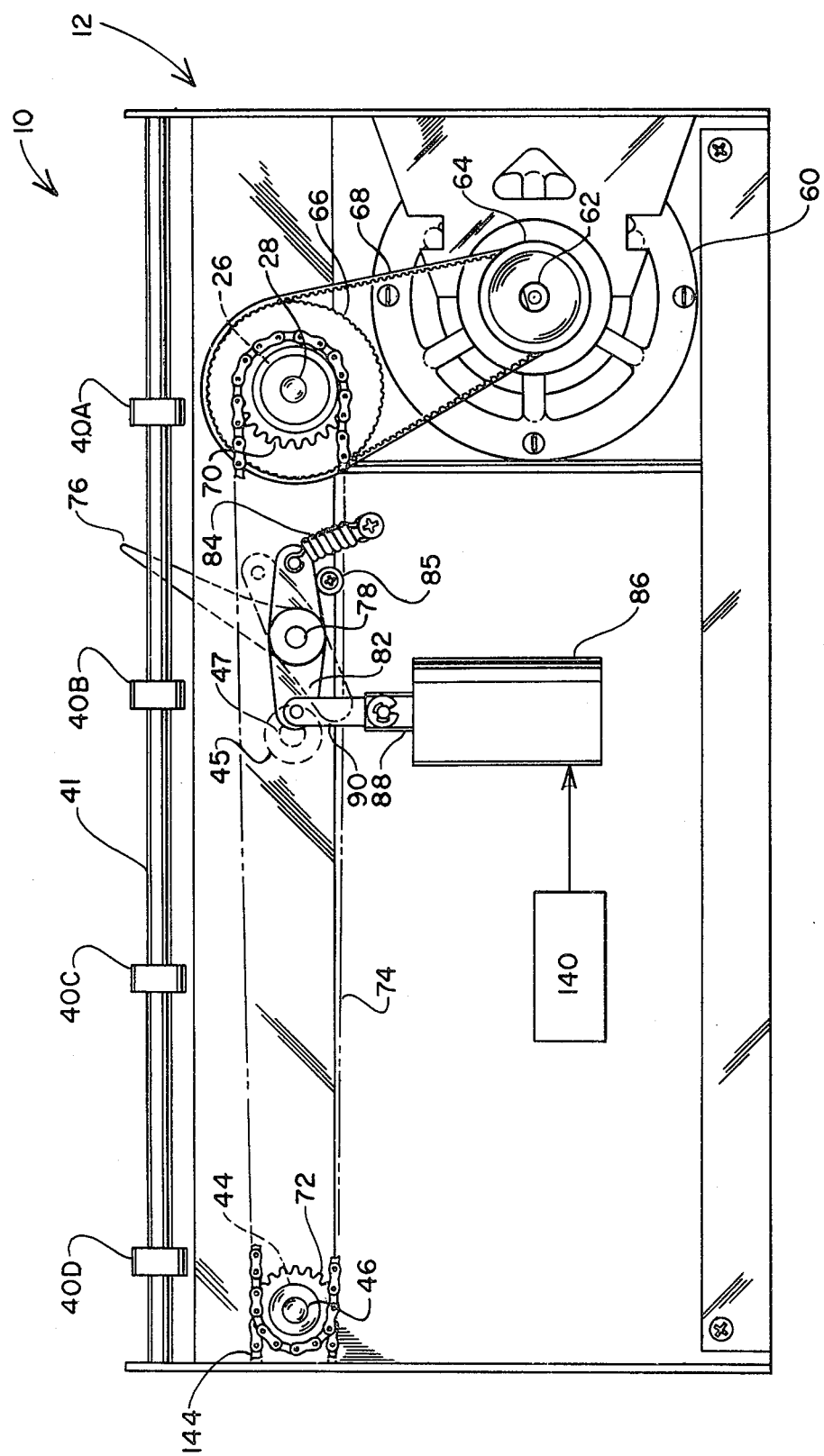
FIG. 2 is a rear view of the apparatus of FIG. 1, showing the gate opened for diverting mailpieces to the stacking means.

To selectively gate mailpieces 18 from the feed deck 14 (FIG. 1) prior to being fed from the apparatus 10, the apparatus 10 includes a plurality of parallel-spaced, generally triangularly-shaped finger members 76, which longitudinally extend between the input feeding means roller 34A and output feeding means belt 50; and includes a shaft 78 on which the respective finger members 76 are suitably fixed mounted for pivotal movement between the closed position shown in FIG. 1 and the opened position shown in FIG. 2. The shaft 78 (FIG. 1) is rotatably connected to the framework 12 by well-known means so as to extend transverse to the direction of feed of the respective mailpieces 18 and to support the finger members 76 such that in their closed position (FIG. 1) the finger members 76 protrude upwardly through a mailpiece receiving opening 80 formed in the feed deck's base wall 16 to act as a horizontally-extendig platform on which mailpieces 18 may be fed from the input feeding means roller 26 to the output feeding means belt 50; and in their opened position (FIG. 2) the finger members 76 protrude upwardly through the opening 80 to act as an upright stop which blocks movement of the respective mailpieces 18 (FIG. 1) being fed to the output feeding means belt 50 and diverts the mailpieces 18 through the opening 80. To rotate the shaft 78 between the closed position (FIG. 1) and opened position (FIG. 2) the selective gating means includes a rocker arm 82 suitably fixedly attached to the shaft 78 for rotation thereof; a coil spring 84, suitably connected to the rocker arm 82 and to the framework 12 for spring urging the rocker arm 82 against a stop 85 and thereby locating the finger members 76 in their closed position, and a solenoid 86 having a plunger 88 suitably connected, as by means of a link 90, to the rocker arm 82 for rotating the arm 82, and thus the finger members 76 into their opened position, against the tension of the coil spring 84 when the solenoid 86 is operated.

For stacking mailpieces 18 (FIG. 1) which are fed through the opening 80, the apparatus 10 includes a receptacle 92 which extends substantially horizontally from beneath the opening 80 in a direction extending at right angles to the direction of feed of mailpieces 18 which are not fed through the opening 80. The receptacle 92 has a mailpiece receiving station 93 and includes a horizontally-extending base wall 94, oppositely-spaced upright side walls 96 and 98, and an upwardly curvedly-extending rear wall 100. Preferably, the side wall 96 is a stationary portion of the framework 12; where s the side wall 98 is suitably movably mounted in slots 102 formed in the base wall 94 to facilitate manually adjustably moving the sidewall 98 toward and away from the side wall 96 for accomodating alignment of mailpieces 18 of different length between the side walls, 96 and 98.

Figure 3:
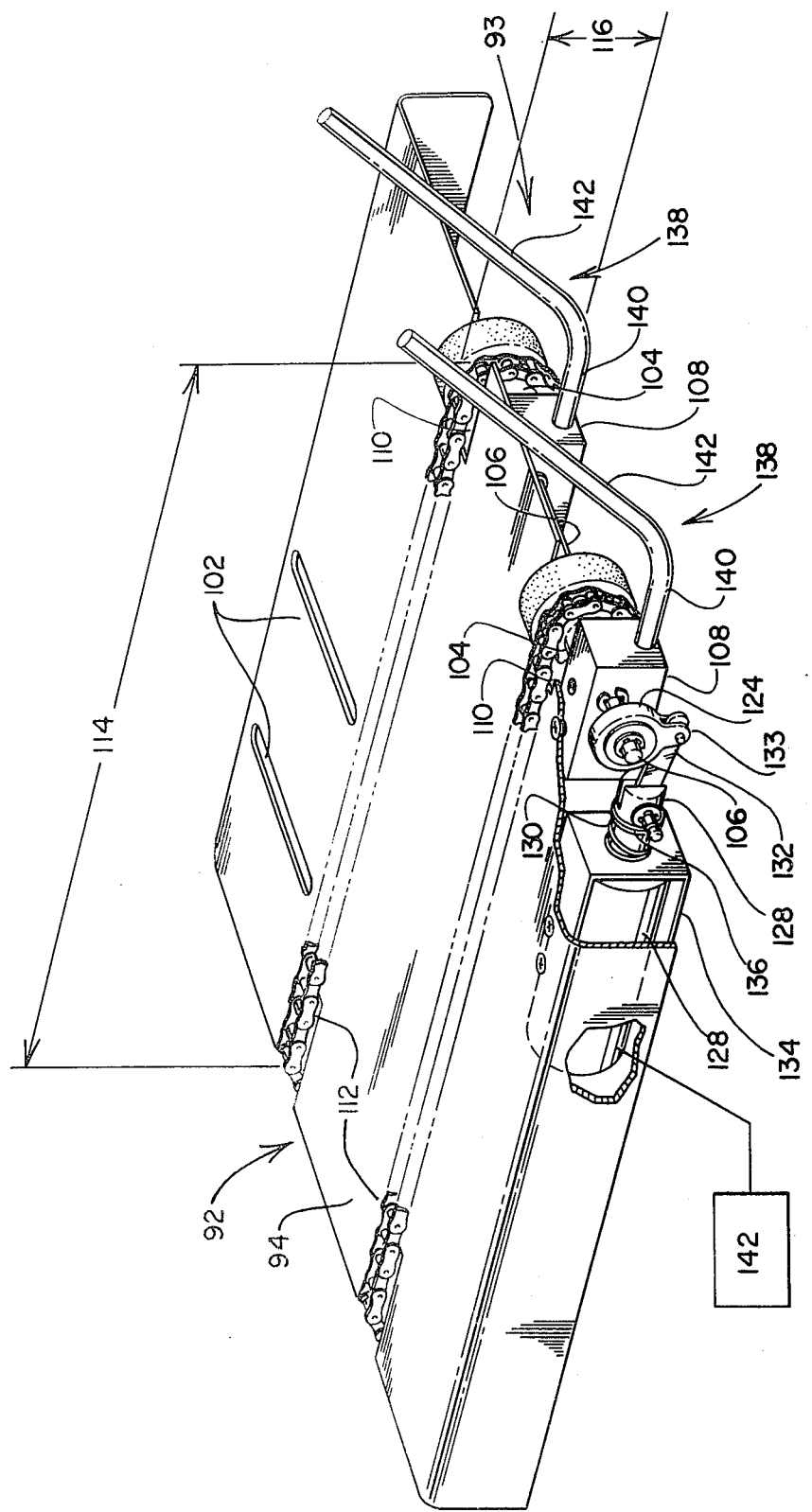
FIG. 3 is a enlarged, more detailed perspective view of the stacking means of FIG. 1.
Figure 4:
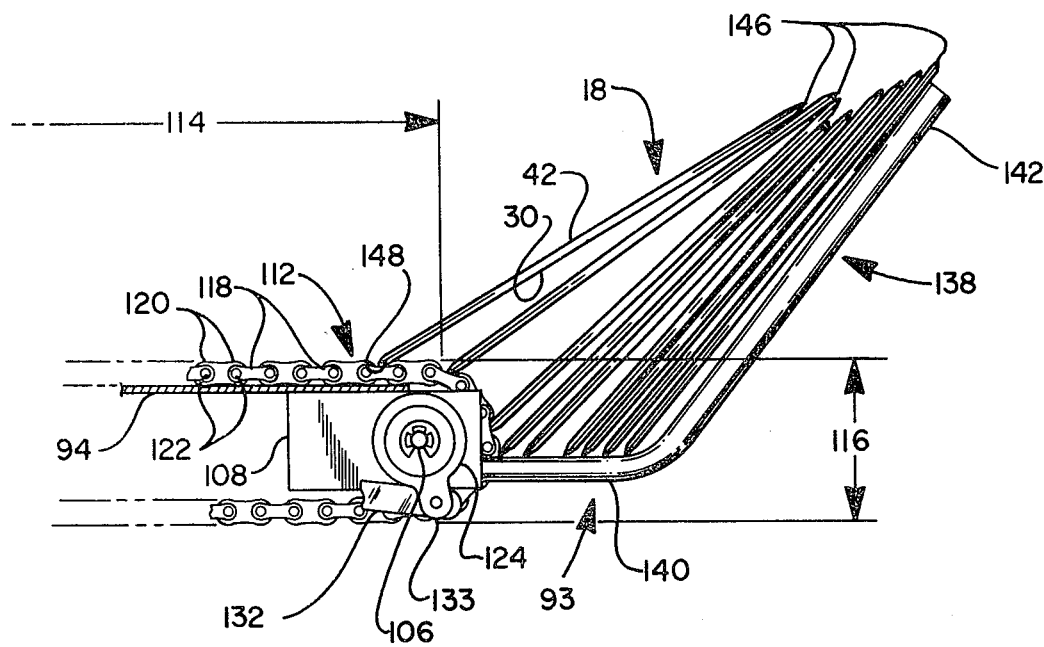
FIG. 4 is a fragmentary, enlarged side view of the stacking means of FIG. 3.

For moving respective mailpieces 18 (FIG. 1) downstream within the receptacle 92 to the receiving station 93, the mailpiece stacking means includes a pair of parallel-spaced sprocket gears 104 (FIG. 3), and a drive shaft 106 on which the respective sprocket gears 104 are suitablay fixedly mounted for rotation therewith. The drive shaft 106 is suitably mounted for rotation in a pair of parallel-spaced blocks 108 fastened to the receptacle's base wall 94 so as to depend therefrom. The drive shaft 106 extends transverse to the direction of movement of respective mailpieces 18 and supports the sprocket gears 104 such that they protrude upwardly through a pair of slots 110 formed in the downsteam end of the receptacle's base wall 94. In addition, the mailpiece moving purposes, the stacking means includes a pair of parallel-spaced, endless roller-link chains 112 looped about the drive sprocket gears 104, and about the receptacle's base wall 94 and a similar pair of conventionally mounted idler sprocket gears (not shown) at the upstream end of the receptacle's base wall 94. As thus arranged the respective chains 112 (FIG. 4) have a substantially horizontally-extending upper run 114 overlying the receptacle's base wall 94 to which the respective mailpieces 18 (FIG. 1) are fed when gated through the opening 80, and has a curvedly downwardly-extending end run 116 (FIG. 5) extending downstream of the downstream end of the receptacle's base wall 94.

In the preferred embodiment each of the chains 112 (FIG. 4) includes a plurality of longitudinally-extending parallel-spaced, connecting links 118; a plurality of transversely-extending, parallel-spaced rollers 120; and a plurality of transversely-extending, parallel-spaced, pin links 122 which extend axially of respective rollers 120 on a one-for-one basis. The pin links 122 support the rollers 120 for rotation and are suitably fixedly interconnected to respective ends of the connecting links 118 so as to provide endless chains 112 having rollers 120 at equidistantly spaced intervals along their respective lengths. The connecting links 118 and rollers 120 also define a non-planar exterior surface on which the respective mailpieces 18 are transported, inasmuch as the respective connecting links 118 are preferably narrower in transverse vertical section than the diameter of the respective rollers 120. In addition, the respective chains 112 have a nominal pitch measurement of not more than one-half an inch and preferably one quarter of an inch, and are therefore adapted to be driven by a sprocket gear 104 having the same nominal pitch measurement.

For moving the respective chains 112 (FIG. 3) the stacking means includes means for indexing the drive shaft 106, and thus the chains 112, including ratchet means such as a one-way ball bearing 124 which is suitably fixedly attached to the drive shaft 106 so as to be actuatable to intermittently rotate the shaft 106 clockwise for incremental movement of the chains 112 (FIG. 1) downstream from beneath the feed deck opening 80 to the receiving station 93. For intermittently actuating the one-way ball bearing 124 (FIG. 3), the indexing means includes a solenoid 126 having a plunger 128, and includes a coil spring 130, a link 132 and a lever 133. The solenoid 126 is suitably fixedly attached to the framework 12, as by means of a bracket 134 fastened to the receptacle's base wall 94. The link 132 is connected to the one-way ball bearing 124 by means of the lever 133 and to the solenoid plunger 128 to act as a crank for converting linear motion of the plunger 128 to rotary motion of the one-way ball bearing 124. And the coil spring 130 is suitably mounted on the plunger 128, as by means of a plunger 136. The identifying means 140 or conventional well-known means 142, such as an electrical connection extending between the solenoids, 86 and 126, for operation thereof in parallel with each other, may be provided for intermittently energizing the solenoid 126 one or more times each time a mailpiece 18 (FIG. 1) has been gated through the opening 80 for stacking purposes. And such conventional means 142 may either be included as a part of the apparatus 10 or be included in a mail processing system associated with the apparatus 10.

In addition, it is within the scope of the invention that the apparatus 10 (FIG. 2) be provided with means for driving the feeding means of a second unit of apparatus 10. To that end the apparatus 10 may include power take off means such as an additional sprocket gear 72 fixedly attached to shaft 46 for rotation in engagement with a chain 144 extending from the apparatus 10 for engagement with a sprocket gear, such as gear 70, mounted on the drive shaft 28 of the second unit of mail handling apparatus 10. In which instance the second unit of apparatus 10 need not include a motor 60, timing bear 64, belt 68 or timing gear 66. With this arrangement two or more units of apparatus 10, with their respective feed decks 14 (FIG. 1) aligned in series, may be utilized for selectively gating mailpieces 18 from their respective feed decks 14 in response to different information being utilized for energization of the appropriate unit's solenoid 86 by means of its associated solenoid energizing means 140. And, the mailpieces 18 thus gated would be stacked by the stacking means of the respective units of apparatus 10 in response to timely operation of the appropriate solenoid 126 by means of its associated solenoid energizing means 140 or 142, as the case may be. Accordingly, the apparatus 10 may be utilized as stand-alone equipment, or in combination with a more complex mail processing system including one or more units of apparatus 10.

Assuming utilization of a single unit of apparatus 10 (FIG. 1) and energization of the input and output feeding means; if the mailpiece identifying means 140 (FIG. 2) does not identify a given mailpieces 18 as one which is to be stacked at the receiving station 93, then the gating means finger members 76 remain in their closed position (FIG. 1) and the mailpiece 18 is edge registered and fed into the apparatus 10 by the input feeding means rollers, 26 and 34A, and maintained in edge registration and fed out of the apparatus 10 by the output feeding means timing belt 50 and rollers 34B–D. On the other hand, each time the mailpiece identifying means 140 (FIG. 2) identifies a given mailpiece 18 as one which is to be stacked at the receiving station 93, the mailpiece identifying means 140 timely signals the respective solenoids, 86 and 126, for energization thereof; or solenoid 86 is timely signalled by the mailpiece identifying means and solenoid 126 is timely energized via the energizing means 142; for respectively timely energizing solenoids 86 and 126. Upon timely energizing the solenoid 86 (FIG. 2), the solenoid's plunger 88 and thus the link 90 are retracted to rotate the rocker arm 82 and the shaft 78 and finger members 76, counterclockwise, against the tension of the coil spring 84, thereby raising the finger members 76 to their opened position (FIG. 2); as a result of which the given mailpiece 18 (FIG. 1) is edge registered and fed into the apparatus 10 by the input feeding means rollers, 26 and 34A, and diverted through the opening 80 by the finger members 76 for disposition on the chains 112 such that the lower major surface 30 of the given mailpiece 18 is initially oriented in a substantially horizontally-extending plane on the respective chains 112 for downstream movement thereby to the receiving station 93. As thus oriented, the given mailpiece 18 has a leading edge 146 and a trailing edge 148. Upon timely energizing the solenoid 126 (FIG. 3), the solenoid's plunger 128 and thus the link 132 are retracted to incrementally rotate the lever 133 and thus the one-way ball bearing 124 and shaft 106, clockwise, against the tension of the coil spring 130, thereby rotating the sprocket gear 104 and thus the drive shaft 106 clockwise to incrementally move the respective chains 112, and thus the mailpiece 18, downstream toward the receiving station 93. When the leading edge 146 of the first mailpiece 18 engages the respective upright portions 142 of the arms 138, the non-planar surfaces of the respective chains 112 (FIG. 4) engage the trailing edge 148 of the given mailpiece 18 and move it upwardly against the respective arms 138 for upright orientation of the mailpiece's opposed major surfaces, 30 and 42. Due to the incremental movement of the chains 112 subsequent mailpieces 18 tend to overlap previous mailpieces 18 on the chains 112. And the trailing edge 148 of each subsequent mailpiece 18 is engaged by the chains 112 and urged upwardly against the previous mailpiece 18 for successive upright orientation of the mailpieces 18 at the receiving station 93. When the trailing edges 148 of the mailpieces 18 reach the end of the downstream end of the chain's upper run 114 they are successively lowered downwardly on the downstream end run 116 of the chains 112 and disposed on the arms 138 at the receiving station 93.

In accordance with the objects of the invention there has been described mail handling apparatus including means for stacking mailpieces.

Inasmuch as certain changes may be made in the above described invention without departing from the spirit and scope of the same, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. Apparatus for handling mailpieces, comprising:
   a. a feed deck including an upright wall;
   b. means for successively feeding mailpieces downstream on said feed deck, said feeding means including means for drivingly engaging the lower major surface of respective mailpieces, said mailpiece feeding means including directional feed roller means, said feed roller means including a flexible shaft, said feed roller means including a metal roller attached to one end of said shaft for rotation with respect thereto, the other end of said shaft fixedly mounted for normally disposing said shaft at an angle with respect to a horizontal plane and disposing said roller at an angle with respect to said engaging means for urging said roller into engagement with the upper major surfaces of respective mailpieces engaged by said engaging means such that said feed roller cooperates with said mailpiece engaging means for urging engaged mailpieces toward said upright wall for edge registration thereagainst of respective mailpieces on said feed deck;
   c. means for selectively gating mailpieces from said deck; and
   d. means for stacking gated mailpieces on edge at a receiving station.

2. The apparatus according to claim 1 wherein said flexible shaft is a coil spring.

3. The apparatus according to claim 1, wherein said feed roller means includes a stub shaft, said roller including a ball bearing and a metal annulus mounted on the outer race of said ball bearing, and said stub shaft interconnecting the inner race of said ball bearing and said flexible shaft.

4. The apparatus according to claim 1, wherein said stacking means includes means for moving mailpieces downstream to the receiving station, said moving means including an endless chain, said chain having a longitudinally-extending non-planar surface on which said mailpieces are successively substantially horizontally oriented for movement to the receiving station, and said stacking means including means at the receiving station for receiving mailpieces from the moving means, said receiving means including upright means cooperative with the non-planar surface of said moving chain for successively uprightly orienting the respective mailpieces at the receiving station.

5. The apparatus according to claim 1, wherein said feed deck has an opening formed therein, said gating means including a plurality of finger members, and said gating means including means for pivotably moving said finger members between a closed position wherein said finger members act as a platform on which respective mailpieces may be fed downstream by said feeding means and an opened position wherein said finger members divert respective mailpieces through said opening to said stacking means.

6. The apparatus according to claim 3, wherein said feed deck has an opening formed therein, said flexible shaft being a coil spring, said gating means including finger means movable between a closed position wherein said finger members act as a platform on which the respective mailpieces are fed by said feeding means and an opened position wherein selected mailpieces are diverted by said finger means through said opening, and said stacking means including means for uprightly orienting mailpieces on edge at the receiving station.

* * * * *